(12) United States Patent
Kobayashi et al.

(10) Patent No.: US 11,961,517 B2
(45) Date of Patent: *Apr. 16, 2024

(54) CONTINUOUS UTTERANCE ESTIMATION APPARATUS, CONTINUOUS UTTERANCE ESTIMATION METHOD, AND PROGRAM

(71) Applicant: NIPPON TELEGRAPH AND TELEPHONE CORPORATION, Tokyo (JP)

(72) Inventors: Kazunori Kobayashi, Tokyo (JP); Shoichiro Saito, Tokyo (JP); Hiroaki Ito, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 17/274,403

(22) PCT Filed: Aug. 28, 2019

(86) PCT No.: PCT/JP2019/033609
§ 371 (c)(1),
(2) Date: Mar. 8, 2021

(87) PCT Pub. No.: WO2020/054406
PCT Pub. Date: Mar. 19, 2020

(65) Prior Publication Data
US 2021/0241772 A1    Aug. 5, 2021

(30) Foreign Application Priority Data

Sep. 11, 2018 (JP) ................. 2018-169552

(51) Int. Cl.
*G10L 15/20* (2006.01)
*G10L 15/08* (2006.01)
*G10L 15/22* (2006.01)

(52) U.S. Cl.
CPC .............. *G10L 15/22* (2013.01); *G10L 15/08* (2013.01); *G10L 2015/088* (2013.01)

(58) Field of Classification Search
None
See application file for complete search history.

(56) References Cited

U.S. PATENT DOCUMENTS 9,691,378 B1 * 6/2017 Meyers ................. G10L 21/028
9,734,845 B1 * 8/2017 Liu .......................... G10L 15/22
(Continued)

FOREIGN PATENT DOCUMENTS

CN    107886944 A    4/2018

OTHER PUBLICATIONS

Sensory, Inc., "TrulyHandsfreeTM", [online], [searched on Aug. 17, 2018], the Internet <URL: http://www.sensory.co.ip/product/thf.htm> with translation generated by machine.

*Primary Examiner* — Seong-Ah A Shin

(57) ABSTRACT

Operations are appropriately changed in accordance with the use method. A keyword detection unit 11 generates a keyword detection result indicating a result of detecting an utterance of a predetermined keyword from an input voice. A voice detection unit 12 generates a voice section detection result indicating a result of detecting a voice section from the input voice. A sequential utterance detection unit 13 generates a sequential utterance detection result indicating that a sequential utterance has been made if the keyword detection result indicates that the keyword has been detected and if the voice section detection result indicates that the voice section has been detected.

4 Claims, 6 Drawing Sheets

(56) References Cited

U.S. PATENT DOCUMENTS

| | | | |
|---|---|---|---|
| 10,825,471 B2 * | 11/2020 | Walley | G10L 15/22 |
| 2009/0299739 A1 * | 12/2009 | Chan | H04R 3/005 |
| | | | 704/225 |
| 2014/0278389 A1 * | 9/2014 | Zurek | G10L 15/20 |
| | | | 704/231 |
| 2018/0174574 A1 * | 6/2018 | Laroche | G10L 15/20 |
| 2019/0295540 A1 * | 9/2019 | Grima | G10L 15/22 |
| 2021/0035561 A1 * | 2/2021 | D'Amato | G06F 3/167 |
| 2021/0035572 A1 * | 2/2021 | D'Amato | G06F 3/167 |
| 2021/0383796 A1 * | 12/2021 | Coucke | G10L 15/22 |
| 2022/0284883 A1 * | 9/2022 | Buchter | G10L 15/20 |
| 2023/0169956 A1 * | 6/2023 | D'Amato | A61M 25/0662 |
| | | | 704/275 |
| 2023/0169971 A1 * | 6/2023 | Tang | G10L 15/30 |
| | | | 704/232 |

* cited by examiner

SEQUENTIAL UTTERANCE ESTIMATION APPARATUS 1

SEQUENTIAL UTTERANCE ESTIMATION METHOD S1

CONTINUOUS UTTERANCE ESTIMATION APPARATUS, CONTINUOUS UTTERANCE ESTIMATION METHOD, AND PROGRAM

CROSS-REFERENCE TO RELATED APPLICATIONS

This application is a U.S. 371 Application of International Patent Application No. PCT/JP2019/033609, filed on 28 Aug. 2019, which application claims priority to and the benefit of JP Application No. 2018-169552, filed on 11 Sep. 2018, the disclosures of which are hereby incorporated herein by reference in their entireties.

TECHNICAL FIELD

This invention relates to a technique for estimating whether or not a target sound is uttered sequentially following an utterance of a keyword.

BACKGROUND ART

An apparatus that can be controlled by voice, such as a smart speaker or an on-board system, may be equipped with a function called "keyword wakeup", which starts speech recognition upon a keyword that serves as a trigger being uttered. Such a function requires a technique for detecting the utterance of a keyword from an input voice signal.

FIG. 1 shows a configuration according to a conventional technique disclosed in Non-Patent Literature 1. According to the conventional technique, upon a keyword detection unit 91 detecting the utterance of a keyword from an input voice signal, a target sound output unit 99 turns a switch on, and outputs the voice signal as a target sound that is to be subjected to speech recognition or the like. Also, a response sound output unit 92 outputs a response sound when the keyword is detected, and notifies a user that an utterance of the keyword has been detected. At this time, to control the timing of processing, a delay unit 93 may further be provided, and the output of the keyword detection unit 91 (see FIG. 1A) or the input voice (see FIG. 1B) may be delayed.

CITATION LIST

Non-Patent Literature

Non-Patent Literature 1: Sensory, Inc., "TrulyHandsfree™", [online], [searched on Aug. 17, 2018], the Internet <URL: http://www.sensory.co.jp/product/thf.htm>

SUMMARY OF THE INVENTION

Technical Problem

However, in the conventional technique, there may be not only a use method in which a keyword is uttered, and then a target sound is uttered after waiting for a response sound, but also a use method in which a keyword and a target sound are sequentially uttered. If the use method is assumed in which a target sound is uttered after waiting for a response sound, and a start position of the target sound section is set after the response sound, a problem arises in that, if the user sequentially utters the keyword and the target sound, the beginning of the utterance of the target sound is lost. Moreover, if the use method is assumed in which a keyword and a target sound are sequentially uttered, and a start position of the target sound section is set immediately after the utterance of the keyword, a problem arises in that the response sound temporally overlaps the utterance of the target sound, and the resultantly detected sound is difficult to recognize.

In view of the above-described technical problems, an object of this invention is to automatically distinguish between the use method in which a keyword is uttered, and then a target sound is uttered after waiting for a response sound, and the use method in which the keyword and the target sound are sequentially uttered, and dynamically change operations appropriately in accordance with the use method.

Means for Solving the Problem

To solve the foregoing problems, a sequential utterance estimation apparatus in a first aspect of this invention includes: a keyword detection unit configured to generate a keyword detection result indicating a result of detecting an utterance of a predetermined keyword from an input voice; a voice detection unit configured to generate a voice section detection result indicating a result of detecting a voice section from the input voice; and a sequential utterance detection unit configured to generate a sequential utterance detection result indicating that a sequential utterance has been made if the keyword detection result indicates that the keyword has been detected, and if the voice section detection result indicates that the voice section has been detected.

Effects of the Invention

According to this invention, it is possible to automatically distinguish between the use method in which a keyword is uttered, and then a target sound is uttered after waiting for a response sound, and the use method in which the keyword and the target sound are sequentially uttered, and therefore, operation can be dynamically changed appropriately in accordance with the use method.

DESCRIPTION OF EMBODIMENTS

In the conventional technique, it is difficult to deal with both the use method in which a keyword is uttered, and then a target sound is uttered after waiting for a response sound, and the use method in which the keyword and the target sound are sequentially uttered. A major problem is that if the use method is assumed in which a keyword is uttered, and then a target sound is uttered after waiting for a response sound, and the response sound is output when the keyword is detected, the response sound overlaps the target sound when a user makes an utterance while assuming the use method in which the keyword and the target sound are sequentially uttered.

Figure 1A:
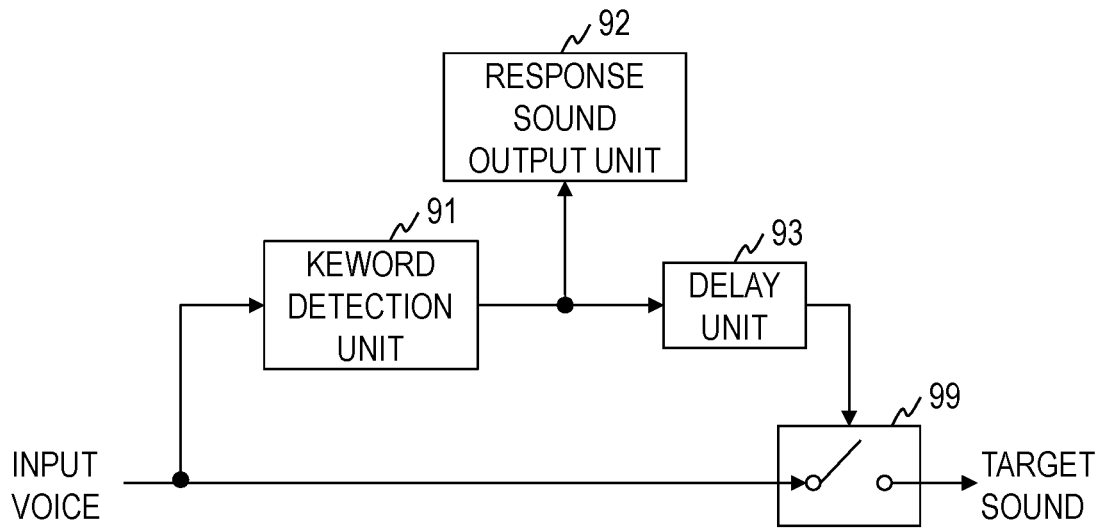
FIG. 1 is a diagram showing an example of a functional configuration of a conventional keyword detection apparatus.
Figure 1B:
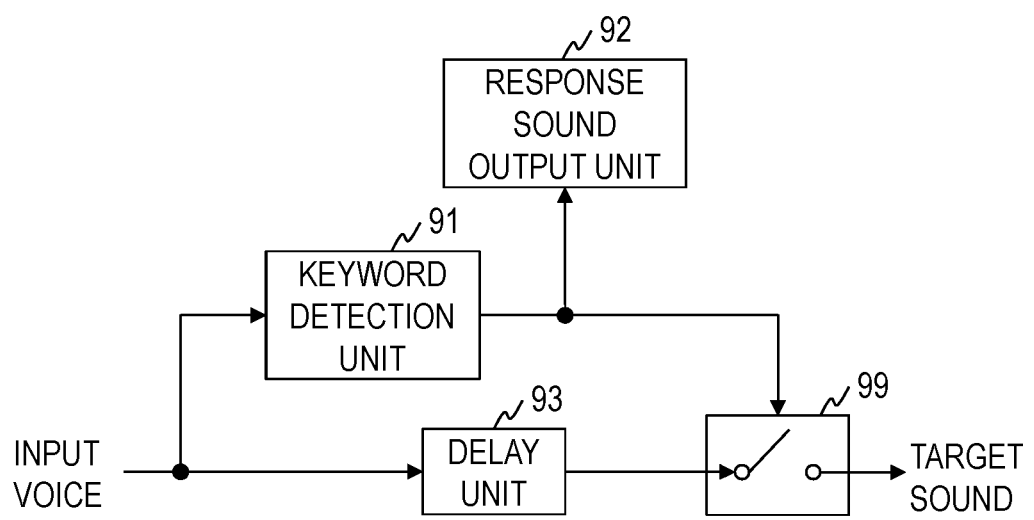
Figure 2A:
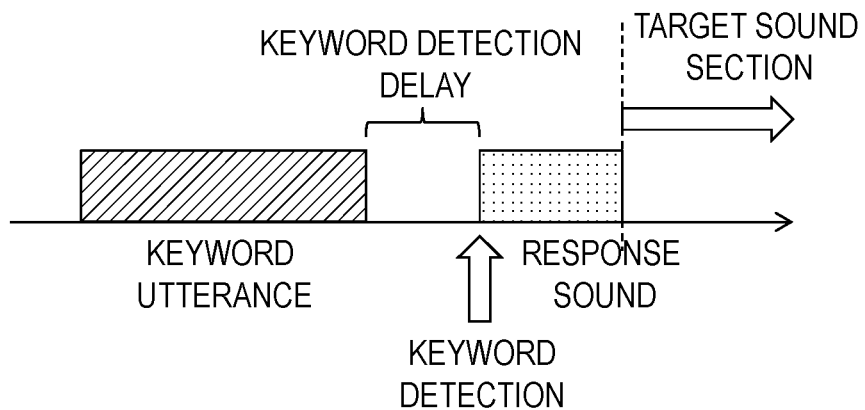
FIG. 2 is a diagram for illustrating a principle of the invention.
Figure 2B:
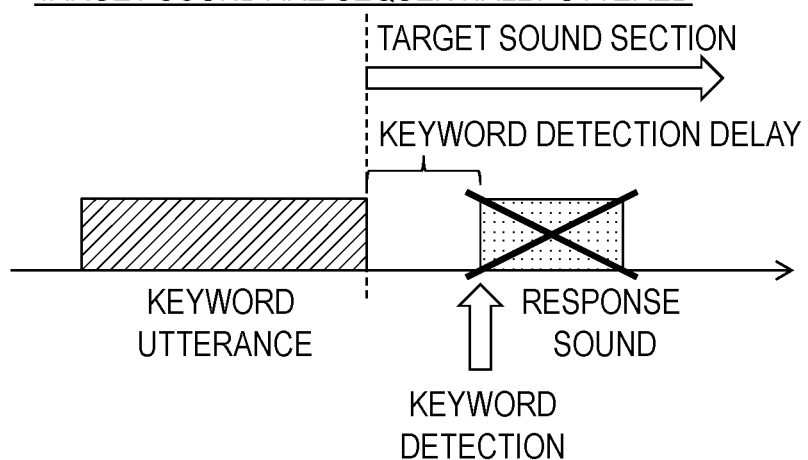

A subject of this invention is to automatically distinguish between the use method in which a keyword is uttered, and then a target sound is uttered after waiting for a response sound, and the use method in which the keyword and the target sound are sequentially uttered, change a start position of a target sound section and the output of the response sound based on the result of distinction, and perform appropriate operation in accordance with the use method. Specifically, if it is determined that the use method is being used in which the keyword is uttered, and then the target sound is uttered after waiting for the response sound, the response sound is first output, and the target sound section is set after the output of the response sound has ended (See FIG. 2A). If it is determined that the use method is being used in which the keyword and the target sound are sequentially uttered, the response sound is not output, and the target sound section is set immediately after the utterance of the keyword has ended (see FIG. 2B).

Hereinafter, embodiments of this invention will be described in detail. Note that constituent units with same functions are assigned same reference numerals in the drawings, and redundant description is omitted.

First Embodiment

Figure 3:
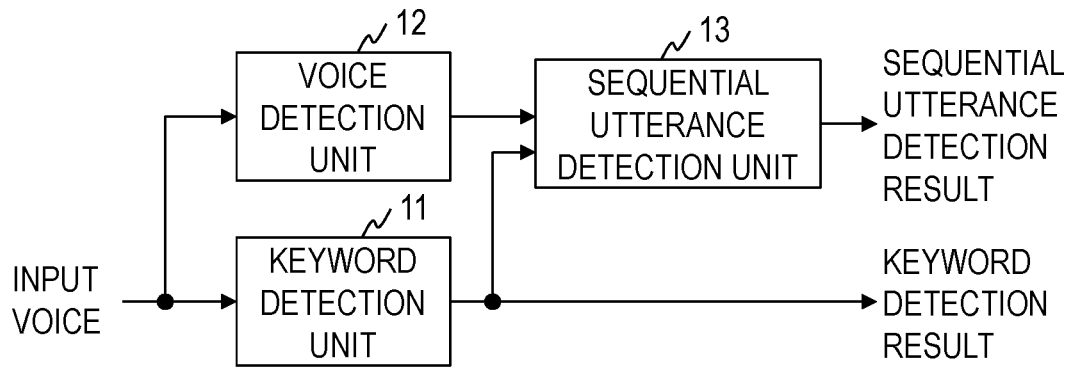
FIG. 3 is a diagram showing an example of a functional configuration of a sequential utterance estimation apparatus of a first embodiment.

A sequential utterance estimation apparatus 1 of the first embodiment receives input of a user's voice (hereinafter referred to as an "input voice"), and outputs a keyword detection result obtained by determining whether or not an utterance of a keyword is included in the input voice, and a sequential utterance detection result obtained by determining whether or not an utterance sequentially following the utterance of the keyword is included. As shown in FIG. 3, the sequential utterance estimation apparatus 1 includes a keyword detection unit 11, a voice detection unit 12, and a sequential utterance detection unit 13. A sequential utterance estimation method S1 of the first embodiment is realized by this sequential utterance estimation apparatus 1 performing processing in steps shown in FIG. 4.

The sequential utterance estimation apparatus 1 is a special apparatus formed by loading a special program to a well-known or dedicated computer that includes a central processing unit (CPU), a main memory (a random-access memory (RAM)), and so on. The sequential utterance estimation apparatus 1 performs various kinds of processing under the control of the central processing unit. Data input to the sequential utterance estimation apparatus 1 or data obtained through various kinds of processing is stored in the main memory, for example, and is loaded to the central processing unit and is used in another kind of processing when necessary. At least part of each processing unit of the sequential utterance estimation apparatus 1 may be constituted by hardware such as a semiconductor circuit.

Figure 4:
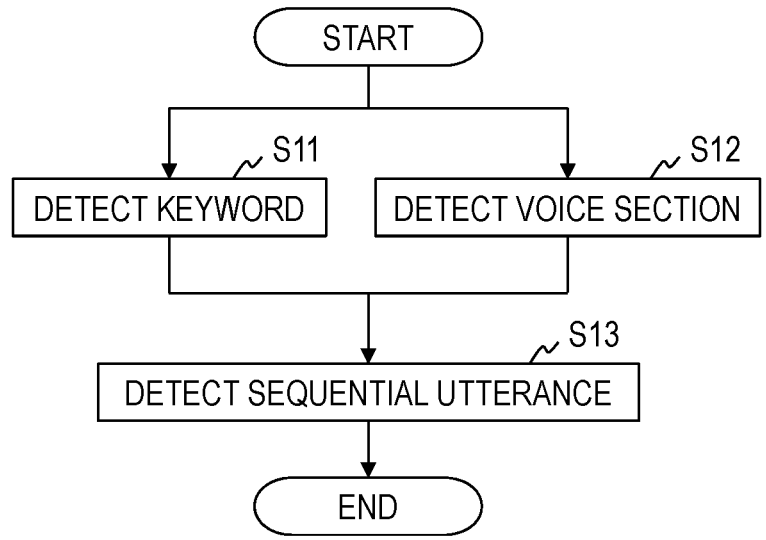
FIG. 4 is a diagram showing a processing procedure of a sequential utterance estimation method of the first embodiment.

A description will be given below, with reference to FIG. 4, of the sequential utterance estimation method performed by the sequential utterance estimation apparatus of the first embodiment.

In step S11, the keyword detection unit 11 detects the utterance of a predetermined keyword from an input voice. A keyword is detected by determining whether or not a power spectrum pattern obtained in short-term cycles is similar to a keyword pattern recorded in advance, using a neural network trained in advance. The keyword detection unit 11 outputs a keyword detection result indicating that a keyword has been detected or indicating that a keyword has not been detected to the sequential utterance detection unit 13.

In step S12, the voice detection unit 12 detects a voice section from the input voice. For example, a voice section is detected in the following manner. First, a stationary noise level N(t) is obtained from a long-term average of the input voice. Next, a threshold value is set by multiplying the stationary noise level N(t) by a predetermined constant $\alpha$. Thereafter, a section in which a short-term average level P(t) is higher than the threshold value is detected as a voice section. Alternatively, a voice section may be detected by using a method in which whether or not the shape of a spectrum or a cepstrum matches the features of a voice is added to factors of determination. The voice detection unit 12 outputs a voice section detection result indicating that a voice section has been detected or a voice section has not been detected to the sequential utterance detection unit 13.

The short-term average level P(t) is obtained by calculating a root mean square power multiplied by a rectangular window of an average keyword utterance time T or a root mean square power multiplied by an exponential window. When a power and an input signal at a discrete time t are respectively denoted as P(t) and x(t), the following formulae are satisfied.

$$P(t) = \frac{1}{T}\sum_{n=t-T}^{t} x(t)^2$$

$$P(t) = \alpha P(t-1) + (1-\alpha)x(t)^2$$

Note that $\alpha$ is a forgetting factor, and a value that satisfies $0 < \alpha < 1$ is set in advance. $\alpha$ is set so that the time constant is an average keyword utterance time T (sample). That is to say, $\alpha = 1 - 1/T$ is satisfied. Alternatively, an absolute value average power multiplied by a rectangular window of the keyword utterance time T or an absolute value average power multiplied by an exponential window may be calculated as expressed by the following formulae.

$$P(t) = \frac{1}{T}\sum_{n=t-T}^{t} |x(t)|$$

$$P(t) = \alpha P(t-1) + (1-a)|x(t)|$$

In step S13, if the keyword detection result output by the keyword detection unit 11 indicates that the keyword has been detected, and the voice section detection result output by the voice detection unit 12 indicates that a voice section has been detected, the sequential utterance detection unit 13 determines that a sequential utterance has been made. Since a delay of about several hundred milliseconds occurs in keyword detection performed by the keyword detection unit 11, the utterance of the keyword has ended when keyword detection processing ends. Accordingly, whether or not a beginning of the sequential utterance exists can be determined based on whether or not a voice section exits when the keyword is detected. The sequential utterance detection unit 13 outputs a sequential utterance detection result indicating that a sequential utterance has been detected or that no sequential utterance has been detected, as the output of the sequential utterance estimation apparatus 1, along with the keyword detection result output by the keyword detection unit 11.

With this configuration, according to the first embodiment, it can be determined whether or not an utterance is made sequentially following an utterance of the keyword. Thus, it is possible to change the start position of the target sound section and the output of the response sound based on the sequential utterance detection result output by the sequential utterance estimation apparatus 1.

Second Embodiment

Figure 5:
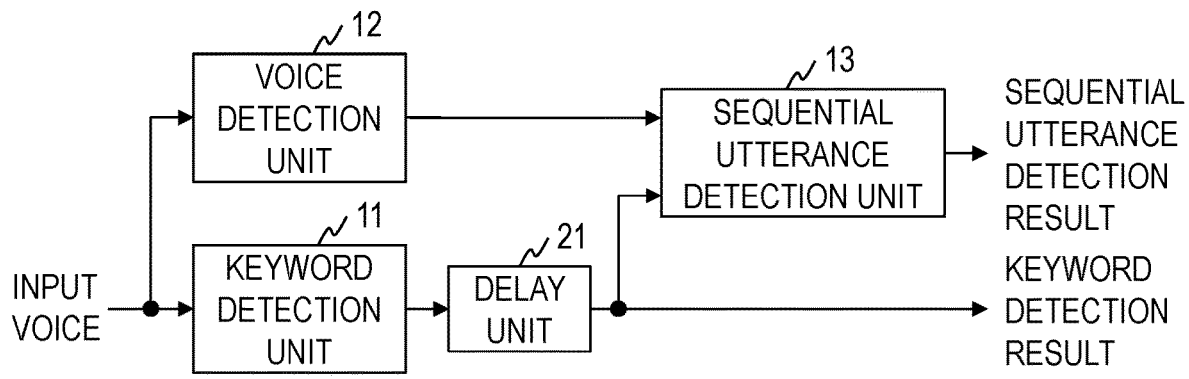
FIG. 5 is a diagram showing an example of a functional configuration of a sequential utterance estimation apparatus of a second embodiment.

A sequential utterance estimation apparatus 2 of the second embodiment receives input of a user's voice and outputs a keyword detection result and a sequential utterance detection result, as with the first embodiment. As shown in FIG. 5, the sequential utterance estimation apparatus 2 further includes a delay unit 21, in addition to the keyword detection unit 11, the voice detection unit 12, and the sequential utterance detection unit 13 of the first embodiment.

The delay unit 21 gives a delay to the keyword detection result output by the keyword detection unit 11. This delay is for giving, to the output of the keyword detection unit 11, a delay corresponding to insufficiency when a delay in keyword detection is too short to determine whether or not a beginning of the sequential utterance exists. When a delay appropriate for determining whether or not a beginning of the sequential utterance exists is X, if a delay in keyword detection is Y, a delay of X-Y is set.

With this configuration, according to the second embodiment, whether or not a sequential utterance have been made can be determined at an appropriate timing.

Third Embodiment

The third embodiment provides a configuration in which the output of the response sound is changed based on the sequential utterance detection result in the first embodiment or the second embodiment. Outputting the response sound when a keyword is detected is considered to notify the user that the keyword has been detected. When the target sound is uttered sequentially following the keyword, the target sound is uttered before the response sound is output, and thus, the response sound is not needed. In this case, if the response sound is output, the response sound overlaps the target sound, which is inconvenient in speech recognition or the like. In the third embodiment, the response sound is not output if a sequential utterance is detected when the keyword is detected, and the response sound is output if no sequential utterance is detected when the keyword is detected.

Figure 6:
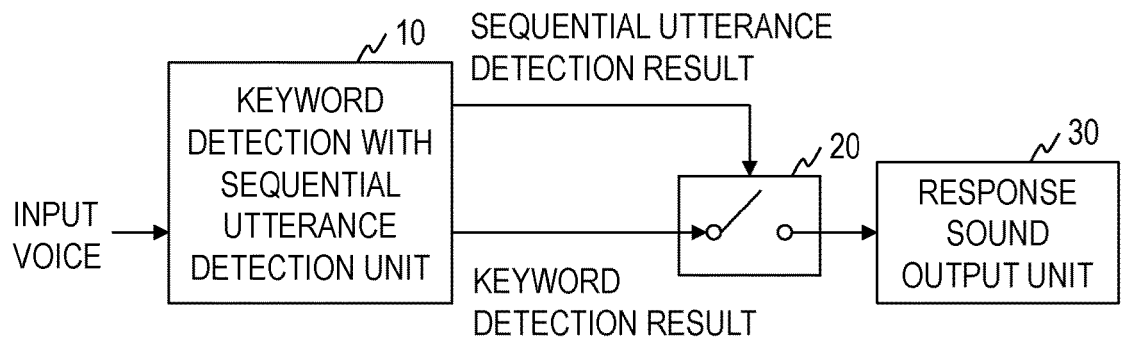
FIG. 6 is a diagram showing an example of a functional configuration of a sequential utterance estimation apparatus of a third embodiment.

A sequential utterance estimation apparatus 3 of the third embodiment receives input of a user's voice, and outputs the response sound if no sequential utterance is detected when the keyword is detected from the input voice. As shown in FIG. 6, the sequential utterance estimation apparatus 3 includes a keyword detection with sequential utterance detection unit 10, a switch unit 20, and a response sound output unit 30.

Specifically, the keyword detection with sequential utterance detection unit 10 is configured similar to the sequential utterance estimation apparatus 1 of the first embodiment or the sequential utterance estimation apparatus 2 of the second embodiment. That is to say, the keyword detection with sequential utterance detection unit 10 at least includes the keyword detection unit 11, the voice detection unit 12, and the sequential utterance detection unit 13, receives input of the user's voice, and outputs a keyword detection result and a sequential utterance detection result.

The switch unit 20 performs control regarding whether or not to transmit, to the response sound output unit the keyword detection result output by the keyword detection with sequential utterance detection unit 10. If the sequential utterance detection result output by the keyword detection with sequential utterance detection unit 10 is true (i.e. if sequential utterance is detected, the keyword detection result is not transmitted to the response sound output unit 30. If the sequential utterance estimation result is false (i.e. if no sequential utterance is detected), the keyword detection result is transmitted to the response sound output unit 30.

If the keyword detection result indicating that the keyword has been detected is transmitted from the switch unit the response sound output unit 30 outputs a predetermined response sound.

With this configuration, according to the third embodiment, if a sequential utterance is made following the keyword, an unnecessary response sound is not output, and thus, degradation in the accuracy of speech recognition or the like can be prevented.

Fourth Embodiment

The fourth embodiment provides a configuration in which the start position of the target sound section is changed based on the sequential utterance detection result in the first embodiment or the second embodiment. In the use method in which the keyword and the target sound are sequentially uttered, it is assumed that, due to a delay in keyword detection, the utterance of the target sound starts before the keyword is detected. For this reason, when the keyword is detected, it is necessary to go back in time to extract the target sound. In the use method in which the keyword is uttered, and then the target sound is uttered after waiting for the response sound, a section after the response sound is extracted as the target sound. For this reason, the target sound needs to be extracted from the point at which a time corresponding to the length of the response sound has elapsed from the point at which the keyword was detected. Otherwise, the response sound overlaps the target sound, and inconvenience may occur in speech recognition or the like.

Figure 7:
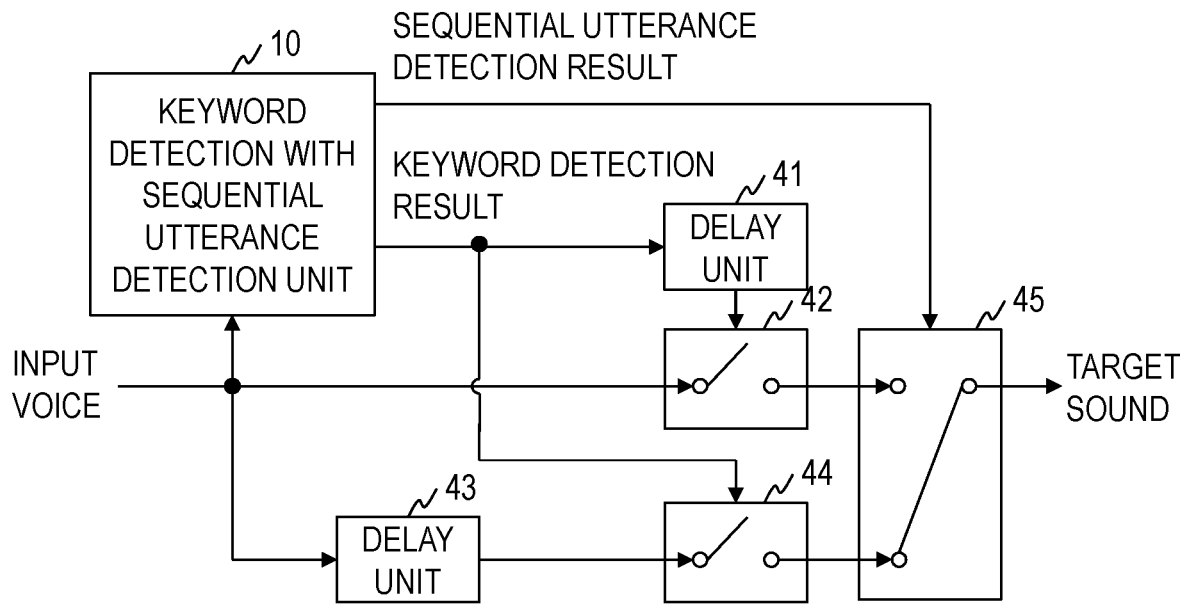
FIG. 7 is a diagram showing an example of a functional configuration of a sequential utterance estimation apparatus of a fourth embodiment.

A sequential utterance estimation apparatus 4 of the fourth embodiment receives input of a user's voice, outputs the target sound immediately after the utterance of the keyword if a sequential utterance is detected when the keyword is detected from the input voice, and outputs the target sound after the output of the response sound has ended if no sequential utterance is detected when the keyword is detected from the input voice. As shown in FIG. 7, the sequential utterance estimation apparatus 4 includes delay units 41 and 43, switch units 42 and 44, and a target sound output unit 45, in addition to the keyword detection with sequential utterance detection unit 10 of the third embodiment.

The delay unit 41 gives a delay by the length of the response sound to the keyword detection result output by the keyword detection with sequential utterance detection unit 10.

The switch unit 42 turns a switch on if the delayed keyword detection result output by the delay unit 41 indicates that the keyword has been detected, and outputs the input voice to the target sound output unit 45. That is to say, the switch unit 42 operates such that the switch turns on after the output of the response sound has ended.

The delay unit 43 gives, to the input voice, a delay corresponding to the delay in keyword detection performed by the keyword detection with sequential utterance detection unit 10.

The switch unit 44 turns a switch on if the keyword detection result output by the keyword detection with sequential utterance detection unit 10 (i.e. the keyword detection result that is not delayed) indicates that the keyword has been detected, and outputs the delayed input voice output by the delay unit 43 to the target sound output unit 45. That is to say, the switch unit 44 operates such that the switch turns on immediately after the utterance of the keyword.

The target sound output unit 45 selects either one of the output of the switch unit 42 and the output of the switch unit 44, and outputs the selected output as the target sound. Specifically, the target sound output unit 45 selects the output of the switch unit 44 (i.e. the input voice immediately after the utterance of the keyword) if the sequential utterance detection result output by the keyword detection with sequential utterance detection unit 10 is true (i.e. if a sequential utterance is detected), and outputs the selected output as the target sound. Also, the target sound output unit 45 selects the output of the switch unit 42 (i.e. the input voice after the output of the response sound) if the sequential utterance detection result is false (i.e. if no sequential utterance is detected), and outputs the selected output as the target sound. Thus, if a sequential utterance is detected when the keyword is detected, the target sound is output immediately after the utterance of the keyword. If no sequential utterance is detected when the keyword is detected, the target sound is output after the output of the response sound has ended.

With this configuration, according to the fourth embodiment, if a sequential utterance is made following the keyword, the input voice immediately after the utterance of the keyword is output as the target sound, and thus a beginning of the utterance can be prevented from being lost in speech recognition or the like. If the target sound is uttered after the response sound is output after the utterance of the keyword, the input voice after the output of the target has ended is output as the target sound, and thus, deterioration in the accuracy of speech recognition due to overlapping of the response sound can be prevented.

Fifth Embodiment

The fifth embodiment provides a configuration that is a combination of the third embodiment and the fourth embodiment. A sequential utterance estimation apparatus 5 of the fifth embodiment receives input of a user's voice, outputs a target sound immediately after the utterance of the keyword if a sequential utterance is detected when the keyword is detected from the input voice, and outputs the response sound if no sequential utterance is detected when the keyword is detected from the input voice, and outputs the target sound after the output of the response sound has ended.

Figure 8:
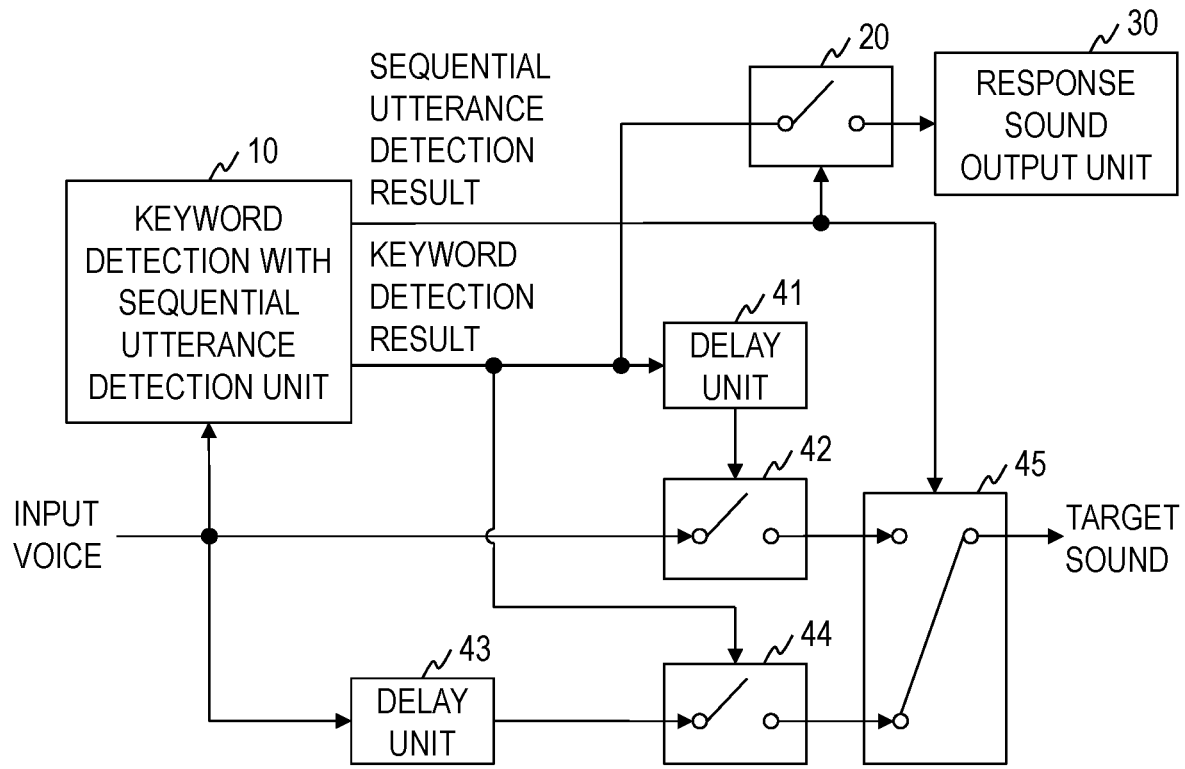
FIG. 8 is a diagram showing an example of a functional configuration of a sequential utterance estimation apparatus of a fifth embodiment.

As shown in FIG. 8, the sequential utterance estimation apparatus 5 includes the keyword detection with sequential utterance detection unit 10, the switch unit 20, and the response sound output unit 30 of the third embodiment, as well as the delay units 41 and 43, the switch units 42 and 44, and the target sound output unit 45 of the fourth embodiment. Operations of these processing units are the same as those of the third embodiment and the fourth embodiment.

Sixth Embodiment

Figure 9:
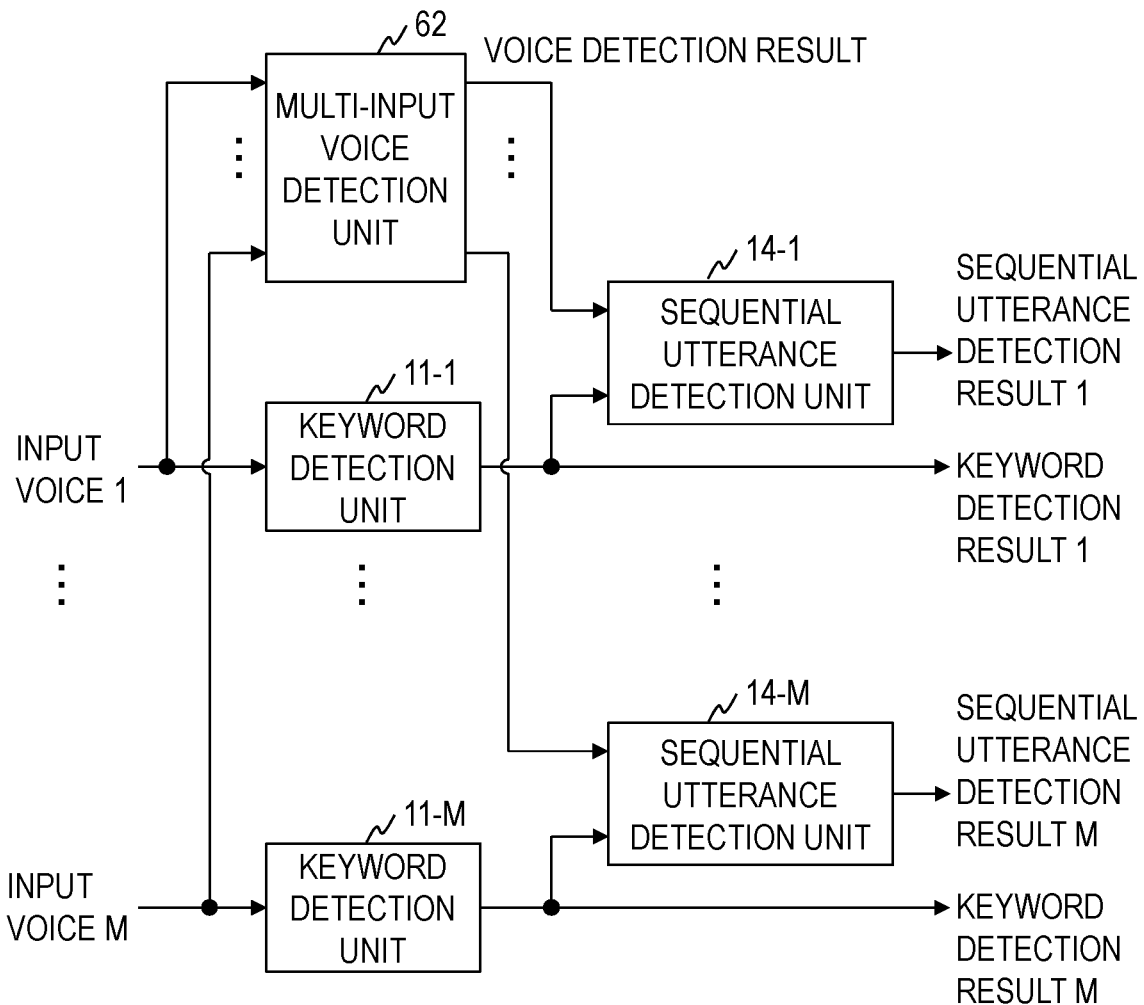
FIG. 9 is a diagram showing an example of a functional configuration of a sequential utterance estimation apparatus of a sixth embodiment.

A sequential utterance estimation apparatus 6 of the sixth embodiment receives input of multichannel voice, and outputs the keyword detection result and the sequential utterance detection result for each channel. As shown in FIG. 9, the sequential utterance estimation apparatus 6 includes sets of the keyword detection unit 11 and the sequential utterance detection unit 14 of the first embodiment, the number of sets corresponding to the number of channels of the input voice M ($\geq 2$), and further includes a multi-input voice detection unit 62 with M-channel input and output.

The multi-input voice detection unit 62 receives multichannel voice signals as inputs, and outputs the voice section detection result of detecting a voice section from a voice signal of an i-th channel, to a sequential utterance detection unit 14-$i$, where i is an integer no less than 1 and no more than M. The multi-input voice detection unit 62 can more accurately detect a voice section by exchanging audio level information between the channels. The method disclosed in Reference Document 1 shown below can be employed as a voice section detection method for multi-channel inputs.

[Reference Document 1] Japanese Patent Application Publication No. 2017-187688

With this configuration, according to the sixth embodiment, it is possible to accurately detect a voice section when multi-channel voice signals are input, which accordingly improves accuracy in sequential utterance estimation.

Although embodiments of the present invention have been described above, a specific configuration is not limited to the embodiments, and even if a design change or the like is made without departing from the gist of the present invention when necessary, such a change is included in the scope of the present invention as a matter of course. The various kinds of processing described in the embodiments are not necessarily executed in chronological order according to order of descriptions, and may be parallelly or individually executed depending on the processing capabilities of the apparatus that executes the processing or according to the need.

[Program and Recording Medium]

When the various processing functions of the apparatuses described in the above embodiments are realized using a computer, the functions that the apparatuses need to have are to be described in the form of a program. A computer executes the program, and thus the various processing functions of the above apparatus are realized on the computer.

The program that describes the contents of such processing can be recorded on a computer-readable recording medium. Any kind of computer-readable recording medium may be employed, such as a magnetic recording device, an optical disc, a magneto-optical recording medium, or a semiconductor memory.

The program is distributed by, for example, selling, transferring, or lending a portable recording medium such as a DVD or a CD-ROM on which the program is recorded. Furthermore, it is possible to employ a configuration in which the program is stored in a storage device of a server computer, and the program is distributed by the server computer transferring the program to other computers via a network.

A computer that executes such a program first stores, in a storage device thereof, the program that is recorded on a portable recording medium or that has been transferred from a server computer. Thereafter, when executing processing, the computer reads the program stored in the storage device thereof, and executes processing according to the program thus read. In another mode of execution of the program, the computer may read the program directly from a portable recording medium and execute processing according to the program. In addition, the computer may sequentially execute processing according to the received program every time the computer receives the program transferred from a server computer. Also, it is possible to employ a configuration for executing the above-described processing by using a so-called ASP (Application Service Provider) type service, which does not transfer a program from the server computer to the computer, but realizes processing functions by only making instructions to execute the program and acquiring the results. The program according to the embodiments may be information that is used by an electronic computer to perform processing, and that is similar to a program (e.g. data that is not a direct command to the computer, but has the property of defining computer processing).

Also, although the apparatus is formed by running a predetermined program on a computer in the embodiments, at least part of the content of the above processing may be realized using hardware.

REFERENCE SIGNS LIST 1, 2, 3, 4, 5, 6 Sequential utterance estimation apparatus
9 Keyword detection apparatus
11, 91 Keyword detection unit
12 Voice detection unit
13 Sequential utterance detection unit
30, 92 Response sound output unit
21, 41, 43, 93 Delay unit
20, 42, 44 Switch unit
45, 99 Target sound output unit
62 Multi-input voice detection unit

What is claimed is:

1. A sequential utterance estimation apparatus comprising:
keyword detection circuitry configured to generate a keyword detection result indicating a result of detecting an utterance of a predetermined keyword from an input voice;
voice detection circuitry configured to generate a voice section detection result indicating a result of detecting a voice section from the input voice;
sequential utterance detection circuitry configured to generate a sequential utterance detection result indicating that a sequential utterance has been made if the keyword detection result indicates that the keyword has been detected, and if the voice section detection result indicates that the voice section has been detected;
a response sound output circuitry configured to output a predetermined response sound if the keyword detection result indicates that the keyword has been detected and if the sequential utterance detection result does not indicate that a sequential utterance has been detected; and
target sound output circuitry configured to output, as a target sound, the input voice delayed by a length of the response sound if the keyword detection result indicates that the keyword has been detected and if the sequential utterance detection result does not indicate that a sequential utterance has been detected, and output the input voice that is not delayed as the target sound if the keyword detection result indicates that the keyword has been detected and if the sequential utterance detection result indicates that a sequential utterance has been detected.

2. The sequential utterance estimation apparatus according to claim 1, wherein
the input voice is a voice signal that includes a plurality of channels,
the voice detection circuitry generates the voice section detection result for each of the channels included in the input voice, and
the sequential utterance estimation apparatus includes a given number of sets each consisting of the keyword detection circuitry and the sequential utterance detection circuitry, where the given number is equal to the number of voice signals of the channels included in the input voice.

3. A sequential utterance estimation method comprising:
generating, by processing circuitry of a sequential utterance estimation apparatus, a keyword detection result indicating a result of detecting an utterance of a predetermined keyword from an input voice;
generating, by the processing circuitry of the sequential utterance estimation apparatus, a voice section detection result indicating a result of detecting a voice section from the input voice;
generating, by the processing circuitry of the sequential utterance estimation apparatus, a sequential utterance detection result indicating that a sequential utterance has been made if the keyword detection result indicates that the keyword has been detected and if the voice section detection result indicates that the voice section has been detected;
outputting, by the processing circuitry of the sequential utterance estimation apparatus, a predetermined response sound if the keyword detection result indicates that the keyword has been detected and if the sequential utterance detection result does not indicate that a sequential utterance has been detected; and
outputting, as a target sound, by the processing circuitry of the sequential utterance estimation apparatus, the input voice delayed by a length of the response sound if the keyword detection result indicates that the keyword has been detected and if the sequential utterance detection result does not indicate that a sequential utterance has been detected, and output the input voice that is not delayed as the target sound if the keyword detection result indicates that the keyword has been detected and if the sequential utterance detection result indicates that a sequential utterance has been detected.

4. A non-transitory computer-readable recording medium on which a program recorded thereon for causing a computer to function as a sequential utterance estimation apparatus comprising:

keyword detection circuitry configured to generate a keyword detection result indicating a result of detecting an utterance of a predetermined keyword from an input voice;

voice detection circuitry configured to generate a voice section detection result indicating a result of detecting a voice section from the input voice;

sequential utterance detection circuitry configured to generate a sequential utterance detection result indicating that a sequential utterance has been made if the keyword detection result indicates that the keyword has been detected, and if the voice section detection result indicates that the voice section has been detected;

a response sound output circuitry configured to output a predetermined response sound if the keyword detection result indicates that the keyword has been detected and if the sequential utterance detection result does not indicate that a sequential utterance has been detected; and target sound output circuitry configured to output, as a target sound, the input voice delayed by a length of the response sound if the keyword detection result indicates that the keyword has been detected and if the sequential utterance detection result does not indicate that a sequential utterance has been detected, and output the input voice that is not delayed as the target sound if the keyword detection result indicates that the keyword has been detected and if the sequential utterance detection result indicates that a sequential utterance has been detected.

* * * * *